US008449832B2

(12) United States Patent
Yao

(10) Patent No.: US 8,449,832 B2
(45) Date of Patent: May 28, 2013

(54) REAGENT STRIP WITH REMOVABLE TIP

(75) Inventor: Simin Yao, Boonton Township, NJ (US)

(73) Assignee: Bayer HealthCare, LLC, Tarrytown, NY (US)

( * ) Notice: Subject to any disclaimer, the term of this patent is extended or adjusted under 35 U.S.C. 154(b) by 210 days.

(21) Appl. No.: 12/743,672

(22) PCT Filed: Dec. 8, 2008

(86) PCT No.: PCT/US2008/085807

§ 371 (c)(1), (2), (4) Date: Jul. 9, 2010

(87) PCT Pub. No.: WO2009/076266

PCT Pub. Date: Jun. 18, 2009

(65) Prior Publication Data

US 2010/0282769 A1 Nov. 11, 2010

Related U.S. Application Data

(60) Provisional application No. 61/007,179, filed on Dec. 10, 2007.

(51) Int. Cl.
*G01N 21/75* (2006.01)

(52) U.S. Cl.
USPC ........... 422/401; 422/400; 422/420; 422/421; 422/422; 422/423; 422/424; 422/425; 422/426; 422/427; 422/428; 422/429; 422/68.1; 422/82.05; 422/82.06; 436/164; 436/169; 436/170; 435/13; 435/283.1; 435/287.1; 435/287.7; 435/287.8; 435/287.9; 435/288.7

(58) Field of Classification Search
USPC ................. 422/400, 401, 420, 421, 422, 423, 422/424, 425, 426, 427, 428, 429, 68.1, 82.05; 436/164, 169, 170; 435/13, 283.1, 287.1, 435/287.7, 287.8, 287.9, 288.7
See application file for complete search history.

(56) References Cited

U.S. PATENT DOCUMENTS

| | | | |
|---|---|---|---|
| 6,180,063 | B1 | 1/2001 | Markart |
| 2007/0048179 | A1 | 3/2007 | Fujita et al. |

FOREIGN PATENT DOCUMENTS

| | | |
|---|---|---|
| EP | 1174716 | 1/2002 |
| WO | WO 2006/065705 | 6/2006 |
| WO | WO 2008/000276 | 1/2008 |

OTHER PUBLICATIONS

Written Opinion corresponding to International Patent Application No. PCT/US2008/085807, European Patent Office, dated Mar. 17, 2009, 6 pages.
International Search Report corresponding to International Patent Application No. PCT/US2008/085807, European Patent Office, dated Mar. 17, 2009, 4 pages.

*Primary Examiner* — Dennis M White
(74) *Attorney, Agent, or Firm* — Nixon Peabody LLP

(57) ABSTRACT

A test sensor includes a base, a lid and a channel for receiving a fluid sample. The channel includes a reagent. The test sensor also includes a tip portion extending from at least one of the base and lid. The tip portion prevents or inhibits moisture or contaminants from entering the channel and affecting the reagent. The test sensor further includes a detachable area located adjacent the tip portion. The detachable area is formed so as to assist movement of the tip portion or removal of the tip portion from the remainder of the test sensor. The movement or removal of the tip portion exposes the channel for receiving the fluid sample.

23 Claims, 3 Drawing Sheets

REAGENT STRIP WITH REMOVABLE TIP

CROSS-REFERENCE TO RELATED APPLICATIONS

This application is a U.S. national stage of International Application No. PCT/US2008/085807, filed Dec. 8, 2008, which claims the benefit of U.S. Provisional Application No. 61/007,179, filed Dec. 10, 2007, both of which are hereby incorporated by reference herein in their entireties.

FIELD OF THE INVENTION

The present invention generally relates to a test sensor for the measurement of analytes. More specifically, the present invention generally relates to a test sensor having a tip portion that is removable to expose an area for receiving a fluid sample.

BACKGROUND OF THE INVENTION

The quantitative determination of analytes in body fluids is of great importance in the diagnoses and maintenance of certain physiological abnormalities. For example, glucose, lactate, cholesterol and bilirubin should be monitored in certain individuals. In particular, it is important that individuals who are diabetics frequently check the glucose level in their body fluids to regulate the glucose intake in their diets. The results of such tests can be used to determine what, if any, insulin or other medication needs to be administered. In one type of blood-glucose testing system, test sensors are used to test a sample of blood.

A test sensor contains biosensing or reagent material that reacts with, for example, blood glucose. One type of a test sensor is an electrochemical test sensor. An electrochemical test sensor is a multilayer test sensor which includes a base or substrate, a lid and a reagent system that reacts with the analyte of interest. The electrochemical test sensors include at least two electrodes in the form of an electrode pattern. A potential is applied across these electrodes and a current is measured at the working electrode. The current is indicative of the concentration of the analyte. It is also contemplated that other types of test sensors may be used including optical test sensors. In optical test sensors, the reagent system and the analyte are reacted to produce a chromatic reaction, which causes the sample to change color. The degree of color change is indicative of the analyte concentration in the body fluid.

The reagent system that is used with the test sensors is sensitive to moisture and other contaminants. Thus, test sensors are often sealed in containers or packaging to prevent moisture or contaminants from affecting the reagent. Current forms of test sensor packaging include drum and blister packs, which are both large in size but hold only a relatively small number of test sensors. Such packaging requires additional attention and effort from the manufacturer. It also may make it more difficult to automatically install the test sensor into a testing device or meter.

Manufacturers and users would benefit from being able to eliminate the sealed containers and bulky packaging and still have any amount of test sensors that a user may desire to carry with the testing device or in a bag and/or container. Therefore, it would be desirable to have a test sensor that does not require sealed packaging, but which still prevents or inhibits moisture and contaminants from affecting the reagent system.

SUMMARY OF THE INVENTION

According to one embodiment, a test sensor comprises a base and a lid. The base and the lid assisting in forming a channel to receive a fluid sample. The channel includes a reagent. The test sensor also comprises a tip portion extending from at least one of the base and lid. The tip portion prevents or inhibits moisture or contaminants from entering the channel. The test sensor further comprises a detachable area located adjacent the tip portion. The detachable area is formed so as to assist in the movement of the tip portion or in the removal of the tip portion from the remainder of the test sensor. The movement or removal of the tip portion exposes the channel for receiving the fluid sample.

According to another embodiment, a method of forming a test sensor comprises the acts of providing a base and a lid and forming a channel via the base and the lid for receiving a fluid sample. The channel includes a reagent. The method also includes forming a tip portion extending from at least one of the base and the lid. The tip portion prevents or inhibits moisture or contaminants from entering the channel. The method further includes forming a detachable area located adjacent the tip portion. The detachable area is formed so as to assist movement of the tip portion or removal of the tip portion from the remainder of the test sensor. The movement or removal of the tip portion exposes the channel for receiving the fluid sample.

DETAILED DESCRIPTION OF ILLUSTRATED EMBODIMENTS

The present invention is directed to an improved test sensor for preventing or inhibiting moisture or contaminants from entering a fluid-receiving channel. The test sensor is adapted to receive a fluid sample to determine information related to an analyte (e.g., an analyte concentration) in the fluid sample using a testing device or meter. Analytes that may be measured include glucose, lipid profiles (e.g., cholesterol, triglycerides, LDL and HDL), microalbumin, hemoglobin A1c, fructose, lactate, urea, creatinine, creatine, bilirubin, and other such analytes. The analytes may be in, for example, a whole blood sample, a blood serum sample, a blood plasma sample, other body fluids like ISF (interstitial fluid) and urine, and non-body fluids.

In one embodiment, the test sensor includes at least a base and a second layer such as a lid. In another embodiment, the test sensor includes a base, a spacer and a lid. The base, spacer and lid may be made from a variety of materials such as polymeric materials. Non-limiting examples of polymeric materials that may be used to form the base, spacer and lid include polycarbonate, polyethylene terephthalate (PET), polystyrene, polyimide, and combinations thereof. It is contemplated that the base, spacer and lid may be independently made of other materials.

The test sensor also includes a reagent system. The reagent system typically contains an enzyme (e.g., glucose oxidase or glucose dehydrogenase), which reacts with an analyte (e.g., glucose) and with a mediator (e.g., ferricyanide) to produce a measurable species that can be detected via electrochemical or optical testing systems. The reagent system may also include additional ingredients such as a buffer and a surfactant in some embodiments of the present invention. It is contemplated that other enzymes may be used to react with glucose such as glucose dehydrogenase.

Figure 1:
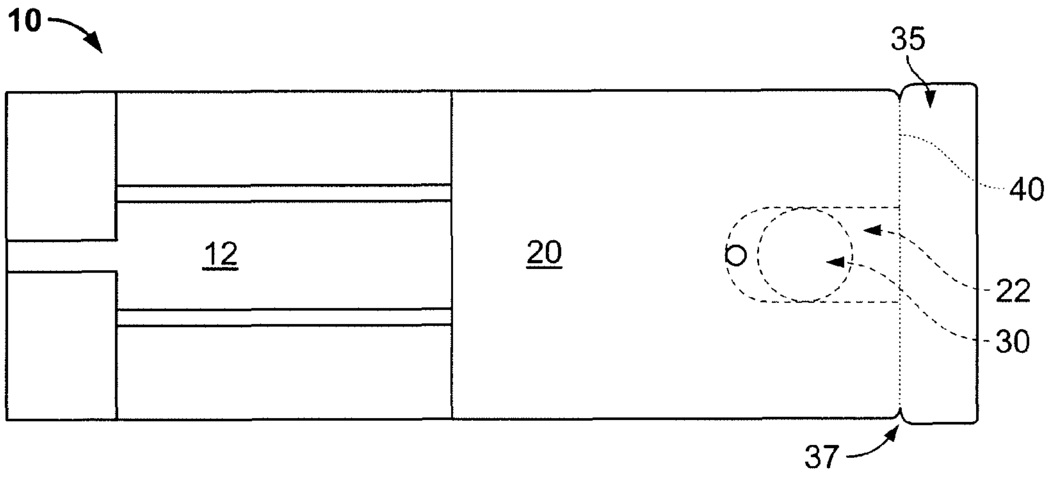
FIG. 1 is a top view of a test sensor having a tip portion according to one embodiment of the present invention.

Turning to the drawings, one non-limiting example of an electrochemical test sensor 10 is shown in FIG. 1. Although an electrochemical test sensor 10 is depicted in the drawings, it is contemplated that other types of test sensors 10 may be used with the present invention, including optical test sensors. The test sensor 10 includes a base 12 and a lid 20. The base 12 and the lid 20 assist in forming a channel 22 (e.g., a capillary channel) when the base 12 and the lid 20 are attached to each other. The capillary channel 22 provides a flow path for introducing the sample into the test sensor 10 and eventually contacting the electrodes (not shown) and, thus, forms a reaction zone. In some embodiments, the test sensor 10 may also include a spacer 25 or middle layer (shown in FIGS. 2*a* and 2*b*) that assists in forming the capillary channel 22.

As shown in FIG. 1, the test sensor 10 includes a reactive or fluid-receiving area 30. The fluid-receiving area 30 includes the reagent system for converting an analyte of interest (e.g., glucose) in a fluid test sample (e.g., blood) into a chemical species that is electrochemically measurable, in terms of the electrical current it produces, by the components of the electrode pattern. As mentioned above, the reagent material contains an enzyme that is selected to react with the desired analyte or analytes to be tested so as to assist in determining an analyte concentration of a fluid sample.

In alternative embodiments, the test sensor may be an optical test sensor. Optical test sensor systems may use techniques such as, for example, transmission spectroscopy, diffuse reflectance or fluorescence spectroscopy for measuring the analyte concentration. The reagent system and analyte in the sample of body fluid are reacted to produce a chromatic reaction—the reaction between the reagent and analyte causes the sample to change color. The degree of color change is indicative of the analyte concentration in the body fluid. The color change of the sample is evaluated to measure the absorbance level of the transmitted light.

Figure 2A:
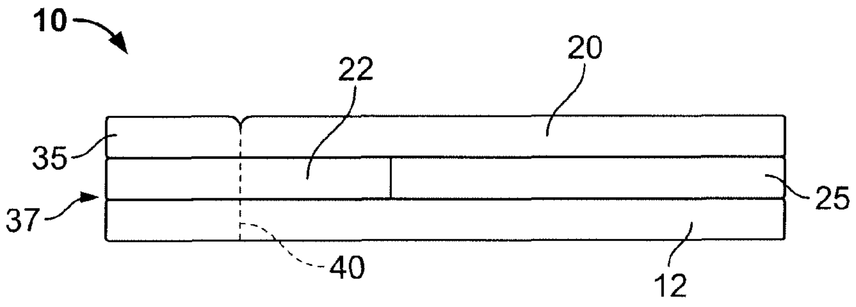
FIG. 2A is a side view of a test sensor having a tip portion according to one embodiment.
Figure 2B:
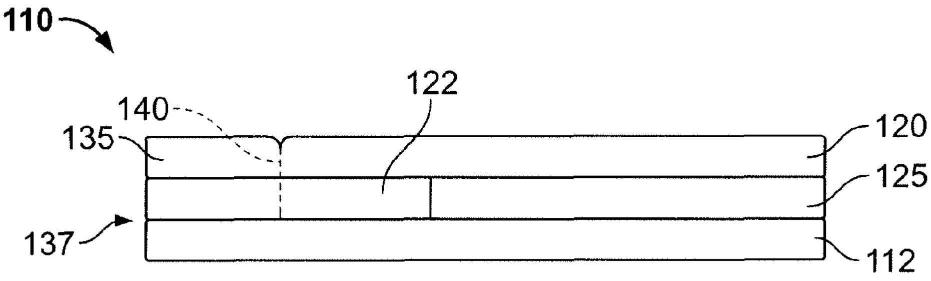
FIG. 2B is a side view of a test sensor having a tip portion according to another embodiment.

As mentioned herein, the fluid-receiving area 30 (for both electrochemical and optical test systems) containing the reagent system may be sensitive to moisture and other contaminants. This sensitivity may cause the reagent to deteriorate, which in turn may cause the test sensor to produce inaccurate or unreliable test results. To prevent or inhibit the reagent from coming into contact with moisture and other contaminants, the test sensor 10 is adapted to include a tip portion 35. The tip portion 35 is adapted to extend from the base 12 and/or the lid 20 of the test sensor 10, as shown in FIGS. 2A and 2B. The tip portion 35 may be of a generally rectangular shape that covers or encloses a sample-receiving end 37 of the test sensor 10 to prevent or inhibit moisture or contaminants from entering the channel 22.

The tip portion 35 may be formed from materials that are the same or similar to materials used to form the base 12 and lid 20. In some embodiments, the material that forms the base 12 may be different than the material that forms the lid 20. Similarly, the tip portion 35 may also include material for forming the bottom layer which is different than the material that forms the top layer. In some embodiments, the lid 20 of the test sensor and the top layer of the tip portion 35 are made from material that is more brittle than the material that forms the base 12 and bottom layer of the tip portion 35. This allows the tip portion 35 to be more easily moved or removed from the test sensor 10. For example, polyethylene terephthalate (PET) may be used to form the base 12 and bottom layer of the tip portion 35, while a more brittle material, such as a polyurethane, may be used to form the lid 20 and top layer of the tip portion 35.

Adjacent to the tip portion 35 is a detachable area 40 that is formed to assist in the movement or removal of the tip portion 35 relative to the base 12 and lid 20. The tip portion 35 must be moved or removed to expose the channel 22 to receive a fluid sample. The detachable area 40 may be notched to facilitate movement or removal of the tip portion 35. Notching may occur in both the top and bottom layers of the detachable area 40 or it may occur only at the top layer. The notching of the detachable area 40 may comprise notches, grooves, perforations, score lines, a plurality of cut lines or stress-concentrated areas that allow a user to more easily move or remove the tip-portion 35. As shown in FIG. 1, the notching of the detachable area 35 may also reduce the total width of the test sensor 10 which enhances the ease of moving or removing the tip portion 35.

The detachable area 40 may extend from the top of the lid 20, through a spacer 25 or middle layer forming the channel 22, and through at least a portion of the base 12, as shown in FIG. 2A. In other embodiments, shown in FIG. 2B, the detachable area 140 may extend from the top of the lid 120 and through the spacer 125 or middle layer forming the channel 122, but may not extend into the base 112. The detachable area 40, 140 may also be provided only internally, such that the user will not see the detachable area 40, 140. To the user, the test sensor 10, 110 and the tip portion 35, 135 may appear as a single smooth layer. To the manufacturer, the internal notching may be easier to incorporate into the manufacturing process.

In some embodiments, the material forming the detachable area 35, and even parts of the tip portion 35, may be modified by localized treatment of the material. Such treatment may include chemical or physical processes. For example, the detachable area 35 may be treated with a line of liquid nitrogen to provide a localized low temperature that would facilitate easier moving or removing of the tip portion 35.

Figure 3A:
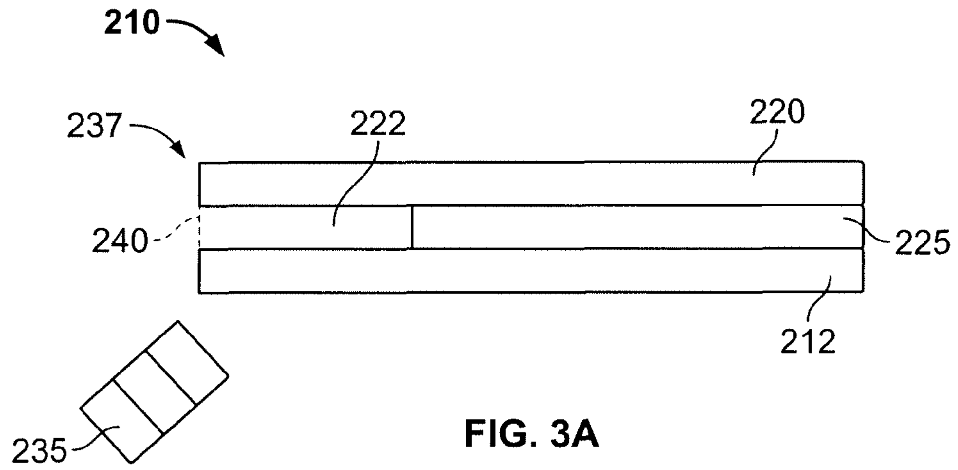
FIG. 3A is a side view of the test sensor of FIG. 2A having the tip portion removed to expose a fluid-receiving channel of the test sensor.
Figure 3B:
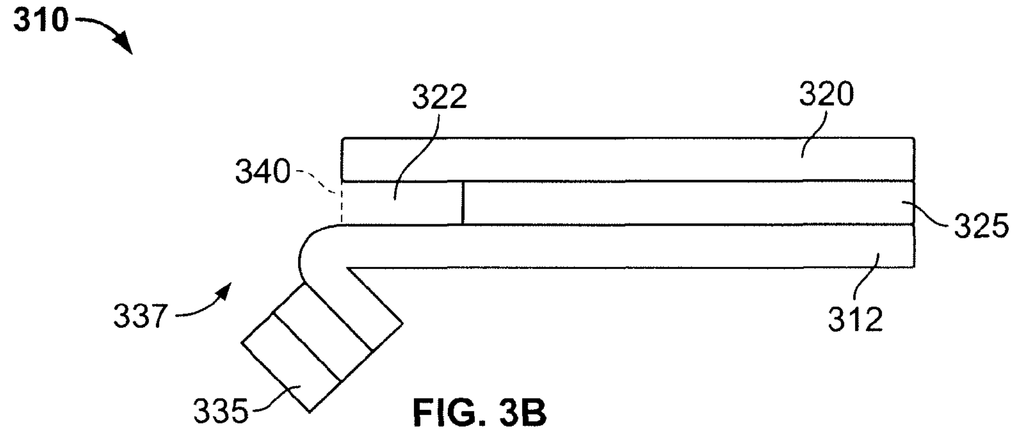
FIG. 3B is a side view of the test sensor of FIG. 2B having the tip portion moved to expose a fluid-receiving channel of the test sensor.

FIG. 3A depicts a test sensor 210 after the tip portion 235 has been removed from the sample-receiving end 237 of the test sensor 210 along the detachable area 240 which extends through the lid 220, the spacer 225 or middle layer and the base 212. Upon removing the tip portion 235, the channel 222 is exposed. Alternatively, in some embodiments, the tip portion may remain attached to the base at the sample-receiving end of the test sensor. For example, as shown in FIG. 3B, the tip portion 335 is moved or removed from the lid 320 and the middle layer 325, but remains attached at the base layer 312 at the sample-receiving end 337 of the test sensor 310. In this embodiment, the detachable area 340 extends into the lid 320 and spacer 325 or middle layer, but not into the base 312. Thus, a smaller portion of the tip portion 335 is moved away from the sample-receiving end 337, although not completely detached from the test sensor 310. A fluid sample may then be introduced into the channel 322.

According to one method, the test sensor 10 is formed from the base 12 and the lid 20 and/or a second layer that assists in forming a channel 22 in the test sensor. The channel 22 assists in allowing a fluid sample to contact a reagent located therein. In some embodiments, a spacer or spacer/lid combination may be included in the test sensor 10. The second layer (e.g., lid or spacer or combination thereof) may be attached to the base 10 using, for example, a pressure-sensitive adhesive and/or a hot melt adhesive. Thus, the attachment uses pressure, heat or the combination thereof. It is contemplated that other materials may be used to attach the second layer and the base. It is also contemplated that the second layer and the base structure may be attached using ultrasonic energy or solvent welding.

In the same or different process for forming the test sensor 10, an additional step or process includes forming a tip portion 35 located at the sample-receiving end 37 of the test sensor 10. The tip portion 35 may extend from the base 10 and lid 20 and may be formed by notching and/or treating a portion of the test sensor 10 before or after the layers of the test sensor 10 are attached, i.e., adhered. The detachable area 40 may be formed adjacent the tip portion 35 to allow easier moving or removing of the tip portion 35. As mentioned herein, the detachable area 40 may be modified using a chemical or physical treatment which may be applied before or after the layers of the test sensor are attached.

Figure 4:
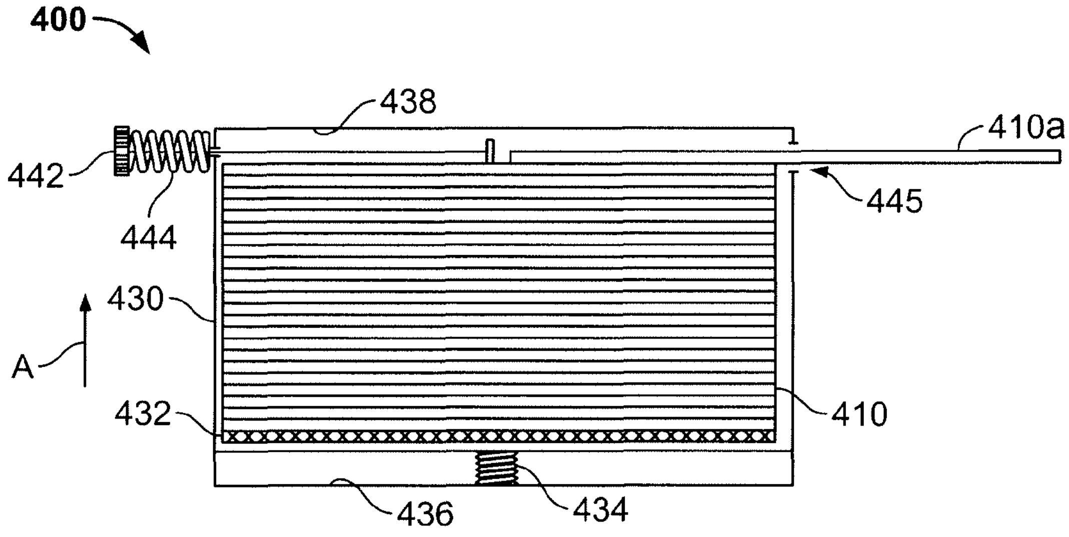
FIG. 4 is a side view of a test-sensor cartridge with portions thereof removed to show the cartridge interior according to one embodiment of the present invention.

FIG. 4 illustrates a magazine or cartridge 400 for containing and dispensing a plurality of test sensors 410 according to one embodiment of the present invention. The cartridge 400 may be adapted to be placed with a sensor-dispensing instrument that assists in determining the analyte concentration. In such an embodiment, the cartridge 400 is typically removed from the sensor-dispensing instrument (and disposed of) once all of the test sensors 410 are used. A second cartridge with an unused plurality of test sensors then replaces the spent cartridge within the instrument. The plurality of test sensors 410 may be electrochemical- or optical-based.

Generally, a test sensor 410 is dispensed from the cartridge 400, one at a time, on an as-needed basis for use in determining an analyte concentration of a fluid sample. The cartridge 400 comprises a housing 430 in which the plurality of test sensors 410 is stacked on a platform 432 therein. The platform 432 is upwardly biased (as viewed in the direction of arrow A in FIG. 4) with a resilient member such as a spring 434 disposed between an interior bottom surface 436 of the housing 430 and the platform 432. The upwardly-biased platform 432 urges the stack of test sensors 410 towards an interior top surface 438 of the housing so as to align an uppermost test sensor 410*a* with a sensor-discharge opening or slot 445 of the housing 430. To better illustrate the platform 432 in the figures, the platform 432 is cross-hatched to better distinguish the platform 432 from the plurality of test sensors 410 stacked thereon.

To dispense a test sensor 410 from the cartridge 400, a plunger 442 is depressed according to one embodiment. The plunger 442 forces the uppermost test sensor 410*a* toward the opening 445 as shown in FIG. 4. After a test sensor 410 is dispensed, a spring 444 moves the plunger 442 to its home position (not shown, to the left as viewed in FIG. 4) to permit the spring 434 to urge the platform 432, and in turn the stack of test sensors 410, upward. At this point, depressing the plunger 442 dispenses a new test sensor 410. In alternative embodiments of the present invention, other mechanisms may be used for dispensing the test sensors 410 from the cartridge 400. For example, a slide mechanism disposed along the top of the cartridge 400, when advanced, may be used to engage and dispense the uppermost test sensor. In other embodiments, an actuator may be used for dispensing the test sensors 410 from the cartridge 400.

The cartridge 400 format allows test sensors 400 to be packaged in a more compact and space-efficient manner to allow more test sensors 400 in a single cartridge 400. This is because the cartridge 400 is smaller in all dimensions than other types of packaging, such as drum and blister pack packaging. The smaller dimensions are desirable by both manufacturers and users. Also, as the individual test sensors 400 of the present invention have movable or removable tip-portions to protect the fluid-receiving channels from moisture and contaminants, additional packaging that may be associated with the cartridge 400 to protect the integrity of the reagent system is not required, i.e., no sealing of the cartridge 400 is required. Furthermore, the cartridge 400 may contain coding information that is associated with the test sensors 410 contained in the cartridge 400 (if the individual test sensors 410 do not include coding information). In this case, once the test sensors 410 are used, the cartridge 411 may be disposed of. Alternatively, if the test sensors 410 do contain coding information (and it is not necessary for the cartridge 400 itself to include coding information), the cartridge 400 may be reused to store new test sensors. The cartridge 400 may also be designed to store testing data in a memory device (not shown). In this case, the cartridge 400 can be provided to doctors, nurses, or other healthcare personnel and the data may be downloaded to inform them of the testing results for a particular user.

Figure 5A:
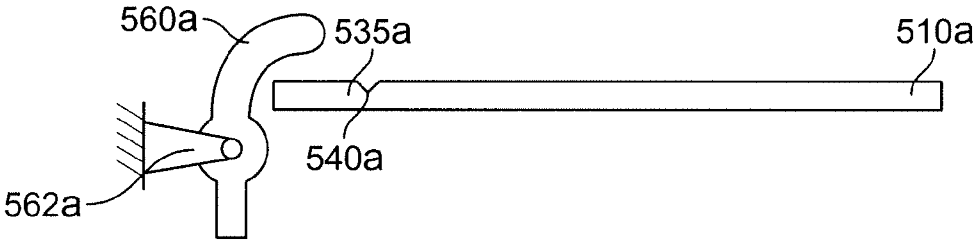
FIG. 5A is a side view of a test sensor and a breaking mechanism for moving removing the tip portion according to one embodiment.
Figure 5B:
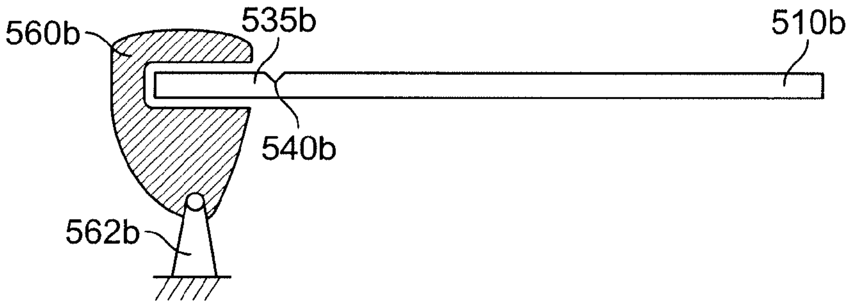
FIG. 5B is a side view of a test sensor and a breaking mechanism for moving or removing the tip portion according to another embodiment.

Referring to other embodiments in FIGS. 5A-5D, a breaking mechanism 560 may be used to assist in removing the tip portion 535 from the test sensor 510 along the detachable area 540. FIGS. 5A-5D depict some examples of different types of breaking mechanisms 560 that may be used with the present invention. In FIG. 5A, for example, a breaking mechanism 560*a* may be used to move or remove the tip portion 535*a* by rotating the breaking mechanism 560*a* at a pivot point 562*a* in a generally clockwise motion and applying a force in a generally downwardly motion to move or remove the tip portion 535 from the test sensor 510. Similarly, in FIG. 5B, a breaking mechanism 560*b* may be used by rotating the breaking mechanism 560*b* at a pivot point 562*b* in a generally counterclockwise motion to contact the tip portion 535*b* and apply a force in a generally upwardly motion to move or remove the tip portion 535*b* from the test sensor 510*b*.

Figure 5C:
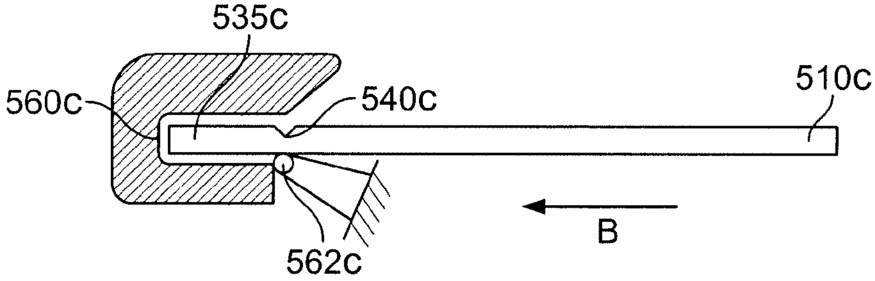
FIG. 5C is a side view of a test sensor having a tip portion and a breaking mechanism for moving or removing the tip portion according to a further embodiment.
Figure 5D:
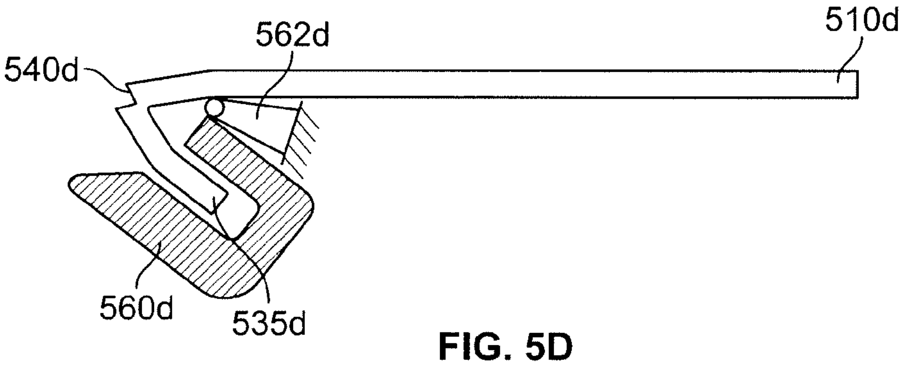
FIG. 5D is a side view of a test sensor having a tip portion that has been moved from the test sensor by the breaking mechanism of FIG. 5C.

Other breaking mechanisms 560*c* may be activated by an actuator (not shown) that, once depressed, dispenses the test sensor 510*c* in the direction of Arrow B and activates the breaking mechanism 560*c* to move the breaking mechanism 560*c* from the position shown in FIG. 5C to the position shown in FIG. 5D. As illustrated in FIG. 5D, the breaking mechanism 540*d* has moved the tip portion 535*d* along the detachable area 540*d* to expose the fluid-receiving channel, although the tip portion 535*d* has not been completely removed from the test sensor 510*d*.

Embodiment A

A test sensor comprising:

a base and a lid, the base and the lid assisting in forming a channel to receive a fluid sample, the channel including a reagent;

a tip portion extending from at least one of the base and lid, the tip portion preventing or inhibiting moisture or contaminants from entering the channel; and a detachable area located adjacent the tip portion, the detachable area being formed so as to assist movement of the tip portion or removal of the tip portion from the remainder of the test sensor, wherein the movement or removal of the tip portion exposes the channel for receiving the fluid sample.

Embodiment B

The test sensor of alternative embodiment A wherein the detachable area extends through at least the lid of the test sensor.

Embodiment C

The test sensor of alternative embodiment A wherein the detachable area extends through at least the lid and the base of the test sensor.

Embodiment D

The test sensor of alternative embodiment A further including a spacer, the spacer and the lid assisting in forming the channel in which to receive the fluid sample.

Embodiment E

The test sensor of alternative embodiment D wherein the detachable area extends through the lid and the spacer of the test sensor.

Embodiment F

The test sensor of alternative embodiment A wherein the detachable area includes notches, grooves, perforations, score lines, a plurality of cut lines, stress-concentrated areas or a combination thereof.

Embodiment G

The test sensor of alternative embodiment A wherein the test sensor having the tip portion is contained in a cartridge for holding a plurality of test sensors.

Process H

A method of forming a test sensor, the method comprising the acts of:

providing a base and a lid;

forming a channel via the base and the lid for receiving a fluid sample, the channel having a reagent;

forming a tip portion extending from at least one of the base and the lid, the tip portion preventing or inhibiting moisture or contaminants from entering the channel; and forming a detachable area located adjacent the tip portion, the detachable area being formed so as to assist movement of the tip portion or removal of the tip portion from the remainder of the test sensor, wherein the movement or removal of the tip portion exposes the channel for receiving the fluid sample.

Process I

The method of alternative process H wherein the detachable area is formed in the base and the lid of the test sensor.

Process J

The method of alternative process H wherein the detachable area is formed in the lid of the test sensor.

Process K

The method of alternative process H further comprising providing a spacer, the spacer being located between the lid and the base, the spacer and the lid assisting in forming the channel in which to receive the fluid sample.

Process L

The method of alternative process K wherein the detachable area is formed in the lid and the spacer of the test sensor.

Process M

The method of alternative embodiment H wherein, after movement of the tip portion, the tip portion remains attached to the base while still exposing the channel for receiving the fluid sample.

Process N

The method of alternative embodiment H wherein, after removal of the tip portion, the tip portion is not attached to the test sensor.

Process O

The method of alternative embodiment H wherein the test sensor having the tip portion is formed along with other test sensors having tip portions for inclusion in a cartridge for dispensing test sensors.

Process P

The method of alternative embodiment H wherein the movement or removal of the tip portion is accomplished as the test sensor is dispensed from the cartridge.

Process Q

The method of alternative embodiment P wherein the movement or removal of the tip portion is accomplished via a breaking mechanism.

Process R

The method of alternative embodiment H wherein the detachable area includes notches, grooves, perforations, score lines, a plurality of cut lines, stress-concentrated areas or a combination thereof.

While the present invention has been described with reference to one or more particular embodiments, those skilled in the art will recognize that many changes may be made thereto without departing from the spirit and scope of the present invention. Each of these embodiments, and obvious variations thereof, is contemplated as falling within the spirit and scope of the invention.

What is claimed is:

1. A test sensor system for containing and dispensing test sensors, the test sensor system comprising:

a housing having at least one sensor opening, a plurality of test sensors being contained in the housing, each of the test sensors including:

(i) a base and a lid, the base and the lid assisting in forming a channel to receive a fluid sample, the channel including a reagent;

(ii) a tip portion extending from at least one of the base and the lid, the tip portion preventing or inhibiting moisture and contaminants from entering the channel; and (iii) a detachable area located adjacent the tip portion to assist in moving the tip portion such that the channel is exposed to receive the fluid sample;

an actuator operative to dispense the test sensors one at a time from the housing in a dispensing direction; and a breaking mechanism positioned adjacent the sensor opening that is configured to engage the tip portion of the test sensor in response to the actuator dispensing the test sensor, the breaking mechanism being further configured to pivot about an axis generally perpendicular to the dispensing direction, thereby causing the tip portion to move along the detachable area such that the channel is exposed to receive the fluid sample.

2. The test sensor system of claim 1, wherein the actuator dispenses the test sensors in the dispensing direction such that the tip portion and the detachable area of the test sensor are moved through the sensor opening.

3. The test sensor system of claim 1, wherein the actuator includes a plunger or a slide mechanism.

4. The test sensor system of claim 1, wherein the detachable area extends through at least the lid of the test sensor.

5. The test sensor system of claim 1, wherein the detachable area extends through at least the lid and the base of the test sensor.

6. The test sensor system of claim 1, further including a spacer, the spacer and the lid assisting in forming the channel in which to receive the fluid sample.

7. The test sensor system of claim 6, wherein the detachable area extends at least through the lid and the spacer of the test sensor.

8. The test sensor system of claim 1, wherein the detachable area includes notches, grooves, perforations, score lines, a plurality of cut lines, stress-concentrated areas or a combination thereof.

9. The test sensor system of claim 1, wherein the breaking mechanism is configured to engage the tip portion by surrounding a portion of the tip portion of the test sensor.

10. The test sensor system of claim 1, wherein the breaking mechanism is coupled to the housing.

11. A method of dispensing a test sensor from a test sensor cartridge, the method comprising the acts of:

providing a test sensor cartridge including a plurality of test sensors, each of the test sensors having a base, a lid, a tip portion, and a detachable area, the base and the lid forming a channel for receiving a fluid sample, the channel having a reagent, the tip portion extending from at least one of the base and the lid, the tip portion preventing or inhibiting moisture and contaminants from entering the channel, the detachable area being located adjacent the tip portion to assist in moving the tip portion such that the channel is exposed to receive the fluid sample;

moving one of the test sensors from the cartridge in a dispensing direction through a sensor slot in a housing of the cartridge;

engaging the tip portion of the test sensor with a breaking mechanism; and in response to the test sensor moving through the sensor slot, pivoting the breaking mechanism about an axis generally perpendicular to the dispensing direction, thereby causing the tip portion to move along the detachment such that the channel is exposed to receive the fluid sample.

12. The method of claim 11, wherein the act of moving one of the test sensors includes moving the one of the test sensors such that the tip portion and the detachable area of the test sensor are moved through the sensor slot.

13. The method of claim 11, wherein the pivoting the breaking mechanism includes moving the breaking mechanism vertically from a first position to a second position.

14. The method of claim 11, wherein the detachable area is at least formed in the base and the lid of the test sensor.

15. The method of claim 11, wherein the detachable area is at least formed in the lid of the test sensor.

16. The method of claim 11, further comprising providing a spacer, the spacer being located between the lid and the base, the spacer and the lid assisting in forming the channel in which to receive the fluid sample.

17. The method of claim 16, wherein the detachable area is at least formed in the lid and the spacer of the test sensor.

18. The method of claim 11, wherein, after the pivoting, the tip portion remains partially attached to the base while still exposing the channel for receiving the fluid sample.

19. The method of claim 11, wherein, after the pivoting, the tip portion is completely detached from the test sensor.

20. The method of claim 11, wherein the pivoting occurs during at least a portion of the moving of the test sensor from the test sensor cartridge.

21. The method of claim 11, wherein the detachable area includes notches, grooves, perforations, score lines, a plurality of cut lines, stress-concentrated areas or a combination thereof.

22. The method of claim 11, wherein the engaging the tip portion of the test sensor includes the breaking mechanism surrounding a portion of the tip portion.

23. The method of claim 11, wherein the breaking mechanism is coupled to the housing.

* * * * *